United States Patent
Robertson et al.

(10) Patent No.: US 7,870,430 B2
(45) Date of Patent: Jan. 11, 2011

(54) METHOD AND APPARATUS FOR SHARING DEBUG RESOURCES

(75) Inventors: Alistair P. Robertson, Glasgow (GB); William C. Moyer, Dripping Springs, TX (US); Ray C. Marshall, Abbots Langley (GB)

(73) Assignee: Freescale Semiconductor, Inc., Austin, TX (US)

( * ) Notice: Subject to any disclaimer, the term of this patent is extended or adjusted under 35 U.S.C. 154(b) by 407 days.

(21) Appl. No.: 12/040,215

(22) Filed: Feb. 29, 2008

(65) Prior Publication Data

US 2009/0222692 A1  Sep. 3, 2009

(51) Int. Cl.
G06F 11/00 (2006.01)
(52) U.S. Cl. .......................................... 714/31; 714/23
(58) Field of Classification Search .................... 714/31
See application file for complete search history.

(56) References Cited

U.S. PATENT DOCUMENTS

| | | | |
|---|---|---|---|
| 6,321,331 B1 | 11/2001 | Roy et al. | |
| 6,553,513 B1 | 4/2003 | Swoboda et al. | |
| 6,591,378 B1 | 7/2003 | Arends et al. | |
| 6,643,803 B1 | 11/2003 | Swoboda et al. | |
| 6,708,270 B1 * | 3/2004 | Mayer | 713/1 |
| 6,895,530 B2 * | 5/2005 | Moyer et al. | 714/25 |
| 7,296,137 B2 * | 11/2007 | Moyer | 711/205 |
| 7,590,891 B2 * | 9/2009 | Ishihara | 714/30 |
| 7,681,078 B2 * | 3/2010 | Moyer | 714/23 |
| 2001/0010083 A1 | 7/2001 | Satoh | |
| 2001/0032305 A1 | 10/2001 | Barry | |
| 2002/0087918 A1 | 7/2002 | Miura et al. | |
| 2003/0074650 A1 | 4/2003 | Akgul et al. | |
| 2003/0093685 A1 | 5/2003 | Tobin | |
| 2004/0148548 A1 | 7/2004 | Moyer et al. | |
| 2005/0027973 A1 | 2/2005 | Barry et al. | |
| 2005/0149693 A1 | 7/2005 | Barry | |
| 2006/0117166 A1 | 6/2006 | Barry | |

(Continued)

OTHER PUBLICATIONS

"e200z6 PowerPC(TM) Core Reference Manual"; Chapter 10-Debug Support'; pp. 10-1 thru 10-14, Title and Information Pages; 2004; Freescale Semiconductor, Inc. http://freescale.com/files/32bit/doc/ref_manual/E200Z6_RM.pdf.

(Continued)

*Primary Examiner*—Scott T Baderman
*Assistant Examiner*—Kamini Patel
(74) *Attorney, Agent, or Firm*—Joanna G. Chiu; James L. Clingan, Jr.

(57) ABSTRACT

A method includes providing an integrated circuit having a plurality of debug resources. The debug resources are usable exclusively for debug operations. The debug operations include operations directed by debug software executed by the integrated circuit and operations directed by external debug hardware which is external to the integrated circuit. The method further includes enabling availability of a first portion of the debug resources for use by the debug software, where a second portion of the debug resources are committed for exclusive use by the external debug hardware. The first portion is exclusive of the second portion. The method includes performing operations directed by the debug software using at least one debug resource of the first portion of the debug resources and operations directed by the external debug hardware using at least one debug resource of the second portion of the debug resources.

17 Claims, 15 Drawing Sheets

U.S. PATENT DOCUMENTS

2008/0222333 A1   9/2008  Barry et al.

OTHER PUBLICATIONS

U.S. Appl. No. 11/750,739, filed May 18, 2007.
U.S. Appl. No. 12/016,664, filed Jan. 18, 2008.

International Search Report and Written Opinion in PCT/US2009/031769, Foreign Counterpart to Related U.S. Appl. No. 12/040,221.
Office Action mailed Jun. 9, 2010 in U.S. Appl. No. 12/040,221.

* cited by examiner

*FIG. 5*

| BIT(S) | NAME | DESCRIPTION | |
|---|---|---|---|
| 0 | EDM | EXTERNAL DEBUG MODE. THIS BIT IS READ-ONLY BY SOFTWARE.<br>0-EXTERNAL DEBUG MODE DISABLED. INTERNAL DEBUG EVENTS NOT MAPPED INTO EXTERNAL DEBUG EVENTS.<br>1-EXTERNAL DEBUG MODE ENABLED. EVENTS WILL NOT CAUSE THE CPU TO VECTOR TO INTERRUPT CODE. SOFTWARE IS NOT PERMITTED TO WRITE TO DEBUG REGISTERS {DBCRx, DBSR, DBCNT1-2, IAC1-4, DAC1-2, DVC1-2}. | 52 |
| 1 | IDM | INTERNAL DEBUG MODE<br>0-DEBUG EXCEPTIONS ARE DISABLED. DEBUG EVENTS DO NOT AFFECT DBSR UNLESS EDM IS SET.<br>1-DEBUG EXCEPTIONS ARE ENABLED. ENABLED DEBUG EVENTS WILL UPDATE THE DBSR AND MAY CAUSE THE CPU TO VECTOR TO INTERRUPT CODE. SOFTWARE IS PERMITTED TO WRITE TO DEBUG REGISTERS. | 54 |
| 2:3 | RST | RESET CONTROL<br>00-NO FUNCTION<br>01-RESERVED<br>10-P_RESETOUT_B PIN ASSERTED BY DEBUG RESET CONTROL TO INITIATE PROCESSOR RESET.<br>11-RESERVED<br>NOTE: THIS FIELD IS UNCONDITIONALLY RESET ON ANY RESET CONDITION. | 56 |
| 4 | ICMP | INSTRUCTION COMPLETE DEBUG EVENT ENABLE<br>0-ICMP DEBUG EVENTS ARE DISABLED<br>1-ICMP DEBUG EVENTS ARE ENABLED | 58 |
| 5 | BRT | BRANCH TAKEN DEBUG EVENT ENABLE<br>0-BRT DEBUG EVENTS ARE DISABLED<br>1-BRT DEBUG EVENTS ARE ENABLED | 60 |
| 6 | IAC1 | INSTRUCTION ADDRESS COMPARE 1 DEBUG EVENT ENABLE<br>0-IAC1 DEBUG EVENTS ARE DISABLED<br>1-IAC1 DEBUG EVENTS ARE ENABLED | 61 |
| 7 | IAC2 | INSTRUCTION ADDRESS COMPARE 2 DEBUG EVENT ENABLE<br>0-IAC2 DEBUG EVENTS ARE DISABLED<br>1-IAC2 DEBUG EVENTS ARE ENABLED | 62 |
| 8 | IAC3 | INSTRUCTION ADDRESS COMPARE 3 DEBUG EVENT ENABLE<br>0-IAC3 DEBUG EVENTS ARE DISABLED<br>1-IAC3 DEBUG EVENTS ARE ENABLED | 63 |
| 9 | IAC4 | INSTRUCTION ADDRESS COMPARE 4 DEBUG EVENT ENABLE<br>0-IAC4 DEBUG EVENTS ARE DISABLED<br>1-IAC4 DEBUG EVENTS ARE ENABLED | 64 |

| BIT(S) | NAME | DESCRIPTION | |
|---|---|---|---|
| 10:11 | DAC1 | DATA ADDRESS COMPARE 1 DEBUG EVENT ENABLE<br>00-DAC1 DEBUG EVENTS ARE DISABLED<br>01-DAC1 DEBUG EVENTS ARE ENABLED ONLY FOR STORE-TYPE DATA STORAGE ACCESSES<br>10-DAC1 DEBUG EVENTS ARE ENABLED ONLY FOR LOAD-TYPE DATA STORAGE ACCESSES<br>11-DAC1 DEBUG EVENTS ARE ENABLED FOR LOAD-TYPE OR STORE-TYPE DATA STORAGE ACCESSES | 66 |
| 12:13 | DAC2 | DATA ADDRESS COMPARE 2 DEBUG EVENT ENABLE<br>00-DAC2 DEBUG EVENTS ARE DISABLED<br>01-DAC2 DEBUG EVENTS ARE ENABLED ONLY FOR STORE-TYPE DATA STORAGE ACCESSES<br>10-DAC2 DEBUG EVENTS ARE ENABLED ONLY FOR LOAD-TYPE DATA STORAGE ACCESSES<br>11-DAC2 DEBUG EVENTS ARE ENABLED FOR LOAD-TYPE OR STORE-TYPE DATA STORAGE ACCESSES | 68 |
| 14 | DCNT1 | DEBUG COUNTER 1 DEBUG EVENT ENABLE<br>0-COUNTER 1 DEBUG EVENTS ARE DISABLED<br>1-COUNTER 1 DEBUG EVENTS ARE ENABLED | 70 |
| 15 | DCNT2 | DEBUG COUNTER 2 DEBUG EVENT ENABLE<br>0-COUNTER 2 DEBUG EVENTS ARE DISABLED<br>1-COUNTER 2 DEBUG EVENTS ARE ENABLED | 71 |
| 16 | TRAP | TRAP TAKEN DEBUG ENABLE<br>0-TRAP DEBUG EVENTS ARE DISABLED<br>1-TRAP DEBUG EVENTS ARE ENABLED | 72 |
| 17-31 | — | RESERVED | 73 |

*FIG. 6*

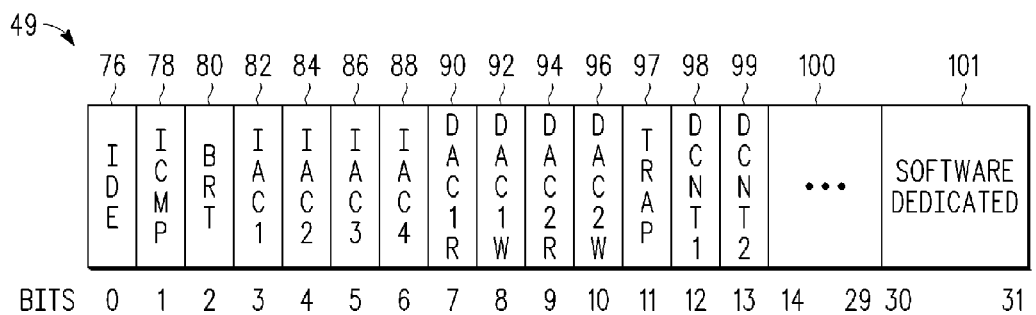

| BIT(S) | NAME | DESCRIPTION | |
|---|---|---|---|
| 0 | IDE | IMPRECISE DEBUG EVENT<br>SET TO 1 IF DEBUG EXCEPTIONS ARE DISABLED AND A DEBUG EVENT CAUSES ITS RESPECTIVE DEBUG STATUS REGISTER BIT TO BE SET TO 1. | 76 |
| 1 | ICMP | INSTRUCTION COMPLETE DEBUG EVENT<br>SET TO 1 IF AN INSTRUCTION COMPLETE DEBUG EVENT OCCURRED. | 78 |
| 2 | BRT | BRANCH TAKEN DEBUG EVENT<br>SET TO 1 IF A BRANCH TAKEN DEBUG OCCURRED. | 80 |
| 3 | IAC1 | INSTRUCTION ADDRESS COMPARE 1 DEBUG EVENT<br>SET TO 1 IF AN IAC1 DEBUG EVENT OCCURRED. | 82 |
| 4 | IAC2 | INSTRUCTION ADDRESS COMPARE 2 DEBUG EVENT<br>SET TO 1 IF AN IAC2 DEBUG EVENT OCCURRED. | 84 |
| 5 | IAC3 | INSTRUCTION ADDRESS COMPARE 3 DEBUG EVENT<br>SET TO 1 IF AN IAC3 DEBUG EVENT OCCURRED. | 86 |
| 6 | IAC4 | INSTRUCTION ADDRESS COMPARE 4 DEBUG EVENT<br>SET TO 1 IF AN IAC4 DEBUG EVENT OCCURRED. | 88 |
| 7 | DAC1R | DATA ADDRESS COMPARE 1 READ DEBUG EVENT<br>SET TO 1 IF A READ-TYPE DAC1 DEBUG EVENT OCCURRED WHILE DBCR0[DAC1]=0b10 OR DBCR0[DAC1]=0b11 | 90 |
| 8 | DAC1W | DATA ADDRESS COMPARE 1 WRITE DEBUG EVENT<br>SET TO 1 IF A WRITE-TYPE DAC1 DEBUG EVENT OCCURRED WHILE DBCR0[DAC1]=0b01 OR DBCR0[DAC1]=0b11 | 92 |
| 9 | DAC2R | DATA ADDRESS COMPARE 2 READ DEBUG EVENT<br>SET TO 1 IF A READ-TYPE DAC2 DEBUG EVENT OCCURRED WHILE DBCR0[DAC2]=0b10 OR DBCR0[DAC2]=0b11 | 94 |
| 10 | DAC2W | DATA ADDRESS COMPARE 2 WRITE DEBUG EVENT<br>SET TO 1 IF A WRITE-TYPE DAC2 DEBUG EVENT OCCURRED WHILE DBCR0[DAC2]=0b01 OR DBCR0[DAC2]=0b11 | 96 |
| 11 | TRAP | TRAP TAKEN DEBUG EVENT<br>SET TO 1 IF A TRAP TAKEN DEBUG EVENT OCCURRED | 97 |
| 12 | DCNT1 | DEBUG COUNTER 1 DEBUG EVENT<br>SET TO 1 IF A DCNT 1 DEBUG EVENT OCCURRED | 98 |
| 13 | DCNT2 | DEBUG COUNTER 2 DEBUG EVENT<br>SET TO 1 IF A DCNT 2 DEBUG EVENT OCCURRED | 99 |
| 14-29 | – | RESERVED | 100 |
| 30:31 | – | SOFTWARE DEDICATED | 101 |

41

| Offset | Field | Bit |
|---|---|---|
| 162 | FT | 31 |
| 160 | ⋮ | 30, 29, 28 |
| 158 | BKPT | 27 |
| 156 | CRET | 26 |
| 154 | CIRPT | 25 |
| 152 | DCNT2 | 24 |
| 150 | DCNT1 | 23 |
| 148 | DEVT2 | 22 |
| 146 | DEVT1 | 21 |
| 144 | 0 | 20, 19, 18, 17 |
| 142 | RET | 16 |
| 140 | 0 | 15 |
| 138 | DAC2 | 14 |
| 136 | 0 | 13 |
| 134 | DAC1 | 12 |
| 132 | IAC4 | 11 |
| 130 | IAC3 | 10 |
| 128 | IAC2 | 9 |
| 126 | IAC1 | 8 |
| 124 | TRAP | 7 |
| 122 | IRPT | 6 |
| 120 | BRT | 5 |
| 118 | ICMP | 4 |
| 116 | UDE | 3 |
| 114 | RST | 2 |
| 112 | IDM | 1 |
| 110 | 0 | 0 |

*FIG. 9*

| BIT(S) | NAME | DESCRIPTION | |
|---|---|---|---|
| 0 | – | RESERVED | ─110 |
| 1 | IDM | INTERNAL DEBUG MODE CONTROL<br>0–INTERNAL DEBUG MODE MAY NOT BE ENABLED BY SOFTWARE. DBCR0[IDM] IS OWNED EXCLUSIVELY BY HARDWARE. mtspr DBCR0-4, DBCNT OR DBSR IS ALWAYS IGNORED. NO RESOURCE SHARING OCCURS, REGARDLESS OF THE SETTINGS OF OTHER FIELDS IN DBERC0. HARDWARE EXCLUSIVELY OWNS ALL RESOURCES. mfspr ACCESS BY SOFTWARE RETURNS 0.<br>1–INTERNAL DEBUG MODE MAY BE ENABLED BY SOFTWARE. DBCR0[IDM] AND DBSR[IDE] ARE OWNED BY SOFTWARE. DBCR0[IDM], DBSR[IDE], AND DBSR[MRR] ARE SOFTWARE READABLE/WRITEABLE.<br>WHEN DBERC0[IDM]=1, HARDWARE-OWNED STATUS AND CONTROL BITS IN DBSR ARE MASKED FROM SOFTWARE ACCESS AND READ AS 0. SOFTWARE WRITES TO HARDWARE-OWNED BITS IN DBCR0-4, DBCNT, AND DBSR VIA mtspr ARE IGNORED. | ─112 |
| 2 | RST | RESET FIELD CONTROL<br>0–DBCR0[RST] OWNED EXCLUSIVELY BY HARDWARE DEBUG. NO mtspr ACCESS BY SOFTWARE TO DBCR0[RST] FIELD. mfspr ACCESS BY SOFTWARE RETURNS 0.<br>1–DBCR0[RST] ACCESSIBLE BY SOFTWARE DEBUG. DBCR0[RST] IS SOFTWARE READABLE/WRITEABLE. | ─114 |
| 3 | UDE | UNCONDITIONAL DEBUG EVENT<br>0–EVENT OWNED BY HARDWARE DEBUG. NO mtspr ACCESS BY SOFTWARE TO DBSR[UDE] FIELD. mfspr ACCESS BY SOFTWARE RETURNS 0.<br>1–EVENT OWNED BY SOFTWARE DEBUG. DBSR[UDE] IS SOFTWARE READABLE/WRITEABLE. | ─116 |
| 4 | ICMP | INSTRUCTION COMPLETE DEBUG EVENT<br>0–EVENT OWNED BY HARDWARE DEBUG. NO mtspr ACCESS BY SOFTWARE TO DBCR0[ICMP] OR DBSR[ICMP] FIELDS. mfspr ACCESS BY SOFTWARE RETURNS 0.<br>1–EVENT OWNED BY SOFTWARE DEBUG. DBCR0[ICMP] AND DBSR[ICMP] ARE SOFTWARE READABLE/WRITEABLE. | ─118 |
| 5 | BRT | BRANCH TAKEN DEBUG EVENT<br>0–EVENT OWNED BY HARDWARE DEBUG. NO mtspr ACCESS BY SOFTWARE TO DBCR0[BRT] OR DBSR[BRT] FIELDS. mfspr ACCESS BY SOFTWARE RETURNS 0.<br>1–EVENT OWNED BY SOFTWARE DEBUG. DBCR0[BRT] AND DBSR[BRT] ARE SOFTWARE READABLE/WRITEABLE. | ─120 |

*FIG. 10*

| BIT(S) | NAME | DESCRIPTION | |
|---|---|---|---|
| 6 | IRPT | INTERRUPT TAKEN DEBUG EVENT<br>0-EVENT OWNED BY HARDWARE DEBUG. NO mtspr ACCESS BY SOFTWARE TO DBCR0[IRPT] OR DBSR[IRPT] FIELDS. mfspr ACCESS BY SOFTWARE RETURNS 0.<br>1-EVENT OWNED BY SOFTWARE DEBUG. DBCR0[IRPT] AND DBSR[IRPT] ARE SOFTWARE READABLE/WRITEABLE. | 122 |
| 7 | TRAP | TRAP TAKEN DEBUG EVENT<br>0-EVENT OWNED BY HARDWARE DEBUG. NO mtspr ACCESS BY SOFTWARE TO DBCR0[TRAP] OR DBSR[TRAP] FIELDS. mfspr ACCESS BY SOFTWARE RETURNS 0.<br>1-EVENT OWNED BY SOFTWARE DEBUG. DBCR0[TRAP] AND DBSR[TRAP] ARE SOFTWARE READABLE/WRITEABLE. | 124 |
| 8 | IAC1 | INTRUCTION ADDRESS COMPARE 1 DEBUG EVENT<br>0-EVENT OWNED BY HARDWARE DEBUG. NO mtspr ACCESS BY SOFTWARE TO IAC1 CONTROL AND STATUS FIELDS. mfspr ACCESS BY SOFTWARE RETURNS 0.<br>1-EVENT OWNED BY SOFTWARE DEBUG. IAC1 CONTROL AND STATUS FIELDS ARE SOFTWARE READABLE/WRITEABLE. | 126 |
| 9 | IAC2 | INTRUCTION ADDRESS COMPARE 2 DEBUG EVENT<br>0-EVENT OWNED BY HARDWARE DEBUG. NO mtspr ACCESS BY SOFTWARE TO IAC2 CONTROL AND STATUS FIELDS. mfspr ACCESS BY SOFTWARE RETURNS 0.<br>1-EVENT OWNED BY SOFTWARE DEBUG. IAC2 CONTROL AND STATUS FIELDS ARE SOFTWARE READABLE/WRITEABLE. | 128 |
| 10 | IAC3 | INTRUCTION ADDRESS COMPARE 3 DEBUG EVENT<br>0-EVENT OWNED BY HARDWARE DEBUG. NO mtspr ACCESS BY SOFTWARE TO IAC3 CONTROL AND STATUS FIELDS. mfspr ACCESS BY SOFTWARE RETURNS 0.<br>1-EVENT OWNED BY SOFTWARE DEBUG. IAC3 CONTROL AND STATUS FIELDS ARE SOFTWARE READABLE/WRITEABLE. | 130 |
| 11 | IAC4 | INTRUCTION ADDRESS COMPARE 4 DEBUG EVENT<br>0-EVENT OWNED BY HARDWARE DEBUG. NO mtspr ACCESS BY SOFTWARE TO IAC4 CONTROL AND STATUS FIELDS. mfspr ACCESS BY SOFTWARE RETURNS 0.<br>1-EVENT OWNED BY SOFTWARE DEBUG. IAC4 CONTROL AND STATUS FIELDS ARE SOFTWARE READABLE/WRITEABLE. | 132 |

*FIG. 11*

| BIT(S) | NAME | DESCRIPTION | |
|---|---|---|---|
| 12 | DAC1 | DATA ADDRESS COMPARE 1 DEBUG EVENT<br>0-EVENT OWNED BY HARDWARE DEBUG. NO mtspr ACCESS BY SOFTWARE TO DAC1 CONTROL AND STATUS FIELDS. mfspr ACCESS BY SOFTWARE RETURNS 0.<br>1-EVENT OWNED BY SOFTWARE DEBUG. DAC1 CONTROL AND STATUS FIELDS ARE SOFTWARE READABLE/WRITEABLE. | ─134 |
| 13 | ─ | RESERVED | ─136 |
| 14 | DAC2 | DATA ADDRESS COMPARE 2 DEBUG EVENT<br>0-EVENT OWNED BY HARDWARE DEBUG. NO mtspr ACCESS BY SOFTWARE TO DAC2 CONTROL AND STATUS FIELDS. mfspr ACCESS BY SOFTWARE RETURNS 0.<br>1-EVENT OWNED BY SOFTWARE DEBUG. DAC2 CONTROL AND STATUS FIELDS ARE SOFTWARE READABLE/WRITEABLE. | ─138 |
| 15 | ─ | RESERVED | ─140 |
| 16 | RET | RETURN DEBUG EVENT<br>0-EVENT OWNED BY HARDWARE DEBUG. NO mtspr ACCESS BY SOFTWARE TO DBCR0[RET] OR DBSR[RET] FIELDS. mfspr ACCESS BY SOFTWARE RETURNS 0.<br>1-EVENT OWNED BY SOFTWARE DEBUG. DBCR0[RET] AND DBSR[RET] ARE SOFTWARE READABLE/WRITEABLE. | ─142 |
| 17:20 | ─ | RESERVED | ─144 |
| 21 | DEVT1 | EXTERNAL DEBUG EVENT 1 DEBUG EVENT<br>0-EVENT OWNED BY HARDWARE DEBUG. NO mtspr ACCESS BY SOFTWARE TO DBCR0[DEVT1] OR DBSR[DEVT1] FIELDS. mfspr ACCESS BY SOFTWARE RETURNS 0.<br>1-EVENT OWNED BY SOFTWARE DEBUG. DBCR0[DEVT1] AND DBSR[DEVT1] ARE SOFTWARE READABLE/WRITEABLE. | ─146 |
| 22 | DEVT2 | EXTERNAL DEBUG EVENT 2 DEBUG EVENT<br>0-EVENT OWNED BY HARDWARE DEBUG. NO mtspr ACCESS BY SOFTWARE TO DBCR0[DEVT2] OR DBSR[DEVT2] FIELDS. mfspr ACCESS BY SOFTWARE RETURNS 0.<br>1-EVENT OWNED BY SOFTWARE DEBUG. DBCR0[DEVT2] AND DBSR[DEVT2] ARE SOFTWARE READABLE/WRITEABLE. | ─148 |

*FIG. 12*

| BIT(S) | NAME | DESCRIPTION | |
|---|---|---|---|
| 23 | DCNT1 | DEBUG COUNTER 1 DEBUG EVENT<br>0-EVENT OWNED BY HARDWARE DEBUG. NO mtspr ACCESS BY SOFTWARE TO COUNTER 1 CONTROL AND STATUS FIELDS. mfspr ACCESS BY SOFTWARE RETURNS 0.<br>1-EVENT OWNED BY SOFTWARE DEBUG. COUNTER 1 CONTROL AND STATUS FIELDS ARE SOFTWARE READABLE/WRITEABLE. | 150 |
| 24 | DCNT2 | DEBUG COUNTER 2 DEBUG EVENT<br>0-EVENT OWNED BY HARDWARE DEBUG. NO mtspr ACCESS BY SOFTWARE TO COUNTER 2 CONTROL AND STATUS FIELDS. mfspr ACCESS BY SOFTWARE RETURNS 0.<br>1-EVENT OWNED BY SOFTWARE DEBUG. COUNTER 2 CONTROL AND STATUS FIELDS ARE SOFTWARE READABLE/WRITEABLE. | 152 |
| 25 | CIRPT | CRITICAL INTERRUPT TAKEN DEBUG EVENT<br>0-EVENT OWNED BY HARDWARE DEBUG. NO mtspr ACCESS BY SOFTWARE TO DBCR0[CIRPT] OR DBSR[CIRPT] FIELDS. mfspr ACCESS BY SOFTWARE RETURNS 0.<br>1-EVENT OWNED BY SOFTWARE DEBUG. DBCR0[CIRPT] AND DBSR[CIRPT] ARE SOFTWARE READABLE/WRITEABLE. | 154 |
| 26 | CRET | CRITICAL RETURN DEBUG EVENT<br>0-EVENT OWNED BY HARDWARE DEBUG. NO mtspr ACCESS BY SOFTWARE TO DBCR0[CRET] OR DBSR[CRET] FIELDS. mfspr ACCESS BY SOFTWARE RETURNS 0.<br>1-EVENT OWNED BY SOFTWARE DEBUG. DBCR0[CRET] AND DBSR[CRET] ARE SOFTWARE READABLE/WRITEABLE. | 156 |
| 22 | BKPT | BREAKPOINT INSTRUCTION DEBUG CONTROL<br>0-BREAKPOINT OWNED BY HARDWARE DEBUG. EXECUTION OF A BKPT INSTRUCTION (ALL 0'S OPCODE) RESULTS IN ENTRY INTO DEBUG MODE.<br>1-BREAKPOINT OWNED BY SOFTWARE DEBUG. EXECUTION OF A BKPT INSTRUCTION (ALL 0'S OPCODE) RESULTS IN ILLEGAL INSTRUCTION EXCEPTION. | 158 |
| 27:30 | - | RESERVED | 160 |
| 31 | FT | FREEZE TIMER DEBUG CONTROL<br>0-DBCR0[FT] OWNED BY HARDWARE DEBUG. NO ACCESS BY SOFTWARE.<br>1-DBCR0[FT] OWNED BY SOFTWARE DEBUG. DBSR[FT] IS SOFTWARE READABLE/WRITEABLE. | 162 |

| DBCR0[EDM] | DBCR0[IDM] | DBERC0[RST] | DBERC0[BRT] | DBERC0[TRAP] | DBERC0[IAC1] | DBERC0[IAC2] | DBERC0[IAC3] | DBERC0[IAC4] | DBERC0[DAC1] | DBERC0[DAC2] | DBERC0[DEVT1] | DBERC0[DEVT2] | DBERC0[DCNT1] | DBERC0[DCNT2] | SOFTWARE ACCESSIBLE |
|---|---|---|---|---|---|---|---|---|---|---|---|---|---|---|---|
| 0 | – | – | – | – | – | – | – | – | – | – | – | – | – | – | DBCR0-4, DBSR, DBCNT — 172 |
| 1 | 1 | – | – | – | – | – | – | – | – | – | – | – | – | – | DBCR0[IDM], DBSR[IDE, VLES] — 176 |
| 1 | 1 | 1 | – | – | – | – | – | – | – | – | – | – | – | – | DBCR0[RST] — 178 |
| 1 | 1 | – | – | – | – | – | – | – | – | – | – | – | – | – | DBCR0[ICMP], DBSR[ICMP] — 180 |
| 1 | 1 | – | 1 | – | – | – | – | – | – | – | – | – | – | – | DBCR0[BRT], DBSR[BRT] — 182 |
| 1 | 1 | – | – | 1 | – | – | – | – | – | – | – | – | – | – | DBCR0[TRAP], DBSR[TRAP] — 184 |
| 1 | 1 | – | – | – | 1 | – | – | – | – | – | – | – | – | – | IAC1, DBCR0[IAC1], DBCR1[IAC1US, IAC1ER], DBSR[IAC1] — 186 |
| 1 | 1 | – | – | – | – | 1 | – | – | – | – | – | – | – | – | IAC2, DBCR0[IAC2], DBCR1[IAC2US, IAC2ER], DBSR[IAC2] — 188 |
| 1 | 1 | – | – | – | 1 | 1 | – | – | – | – | – | – | – | – | DBCR1[IAC12M] — 190 |
| 1 | 1 | – | – | – | – | – | 1 | – | – | – | – | – | – | – | IAC3, DBCR0[IAC3], DBCR1[IAC3US, IAC3ER], DBSR[IAC3] — 192 |
| 1 | 1 | – | – | – | – | – | – | 1 | – | – | – | – | – | – | IAC4, DBCR0[IAC4], DBCR1[IAC4US, IAC4ER], DBSR[IAC4] — 194 |
| 1 | 1 | – | – | – | – | – | 1 | 1 | – | – | – | – | – | – | DBCR1[IAC34M] — 196 |
| 1 | 1 | – | – | – | – | – | – | – | 1 | – | – | – | – | – | DAC1, DVC1, DBCR0[DAC1], DBCR2[DAC1US, DAC1ER, DVC1M, DVC1BE] DBCR4[DVC1C] DBSR[DAC1R, DAC1W] — 198 |

FIG. 15

| DBCR0[EDM] | DBERC0[IDM] | DBERC0[RST] | DBERC0[BRT] | DBERC0[TRAP] | DBERC0[IAC1] | DBERC0[IAC2] | DBERC0[IAC3] | DBERC0[IAC4] | DBERC0[DAC1] | DBERC0[DAC2] | DBERC0[DEVT1] | DBERC0[DEVT2] | DBERC0[DCNT1] | DBERC0[DCNT2] | SOFTWARE ACCESSIBLE | |
|---|---|---|---|---|---|---|---|---|---|---|---|---|---|---|---|---|
| 1 | 1 | – | – | – | – | – | – | – | – | 1 | – | – | – | – | DAC2, DVC2, DBCR0[DAC2], DBCR2[DAC2US, DAC2ER, DVC2M, DVC2BE] DBCR4[DVC2C] DBSR[DAC2R, DAC2W] | 200 |
| 1 | 1 | – | – | – | – | – | – | – | 1 | 1 | – | – | – | – | DBCR2[DAC12M] | 202 |
| 1 | 1 | – | – | 1 | – | – | – | – | 1 | – | – | – | – | – | DBCR2[DAC1LNK] | 204 |
| 1 | 1 | – | – | – | – | – | 1 | – | – | 1 | – | – | – | – | DBCR2[DAC2LNK] | 206 |
| 1 | 1 | – | – | – | – | – | – | – | – | – | – | – | 1 | – | DBCR0[DCNT1], DBCR3[DEVTC1, DEVT2C1, ICMPC1, IAC1C1, IAC2C1, IAC3C2, IAC4C1, DAC1RC1, DAC1WC1, DAC2RC1, DAC2WC1, IRPTC1, RETC1, DEVT1T1, DEVT2C1, IAC1T1, IAC3T1, DAC1RT1, DAC1WT1, CNT2T1], DBSR[DCNT1, CNT1TRG], DBCNT[CNT1] | 208 |
| 1 | 1 | – | – | – | – | – | – | – | – | – | – | – | – | 1 | DBCR0[DCNT1], DBCR3[DEVTC2, DEVT2C2, ICMPC2, IAC1C2, IAC2C2, IAC3C2, IAC4C2, DAC1RC2, DAC1WC2, DAC2RC2, DAC2WC2], DBSR[DCNT1], DBCNT[CNT1] | 210 |

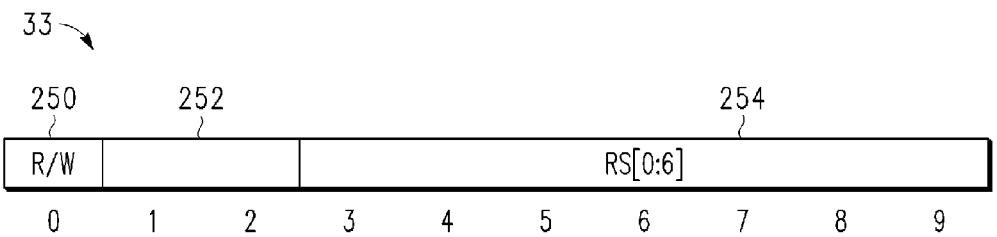

FIG. 18

| BIT(S) | NAME | DESCRIPTION | |
|---|---|---|---|
| 0 | R/W | READ/WRITE COMMAND BIT<br>THE R/W BIT SPECIFIES THE DIRECTION OF DATA TRANSFER. THE TABLE BELOW DESCRIBES THE OPTIONS DEFINED BT THE R/W BIT.<br>  0-WRITE THE DATA ASSOCIATED WITH THE COMMAND INTO THE REGISTER SPECIFIED BY RS[0:6]<br>  1-READ THE DATA CONTAINED IN THE REGISTER SPECIFIED BY RS[0:6]<br><br>NOTE: THE R/W BIT GENERALLY IGNORED FOR READ-ONLY OR WRITE-ONLY REGISTERS. | 250 |
| 1:2 | - | RESERVED | 252 |
| 3:9 | RS | REGISTER SELECT<br>THE REGISTER SELECT BITS DEFINE WHICH REGISTER IS SOURCE (DESTINATION) FOR THE READ (WRITE) OPERATION. ATTEMPTED WRITES TO READ-ONLY REGISTERS ARE IGNORED. | 254 |

| RS[0:6] | REGISTER SELECTED | |
|---|---|---|
| 000 0000 | RESERVED | 262 |
| 000 0001 | RESERVED | 264 |
| 000 0010 | JTAG ID (READ-ONLY) | 266 |
| 000 0011–<br>000 1111 | RESERVED | 268 |
| 001 0001 | NO REGISTER SELECTED (BYPASS) | 270 |
| 001 0011 | RESERVED | 272 |
| 001 0100–<br>001 1111 | RESERVED | 274 |
| 010 0000 | INSTRUCTION ADDRESS COMPARE 1 (IAC1) | 276 |
| 010 0001 | INSTRUCTION ADDRESS COMPARE 2 (IAC2) | 278 |
| 010 0010 | INSTRUCTION ADDRESS COMPARE 3 (IAC3) | 280 |
| 010 0011 | INSTRUCTION ADDRESS COMPARE 4 (IAC4) | 282 |
| 010 0100 | DATA ADDRESS COMPARE 1 (DAC1) | 284 |
| 010 0101 | DATA ADDRESS COMPARE 2 (DAC2) | 286 |
| 010 0110 | DATA VALUE COMPARE 1 (DVC1) | 288 |
| 010 0111 | DATA VALUE COMPARE 2 (DVC2) | 290 |
| 010 1000–<br>010 1011 | RESERVED | 292 |
| 010 1100 | DEBUG COUNTER REGISTER (DBCNT) | 294 |
| 010 1101–<br>010 1111 | RESERVED | 296 |
| 011 0000 | DEBUG STATUS REGISTER (DBSR) | 298 |
| 011 0001 | DEBUG CONTROL REGISTER 0 (DBCR0) | 300 |
| 011 0010 | DEBUG CONTROL REGISTER 1 (DBCR1) | 302 |
| 011 0011 | DEBUG CONTROL REGISTER 2 (DBCR2) | 304 |
| 011 0100 | DEBUG CONTROL REGISTER 3 (DBCR3) | 306 |
| 011 0101–<br>011 1110 | RESERVED (DO NOT ACCESS) | 308 |
| 011 1111 | DEBUG EXTERNAL RESOURCE CONTROL (DBERC0) | 310 |
| 100 0000–<br>111 1110 | RESERVED (DO NOT ACCESS) | 312 |
| 111 1111 | BYPASS | 314 |

METHOD AND APPARATUS FOR SHARING DEBUG RESOURCES

CROSS-REFERENCE TO RELATED APPLICATION(S)

This application is related to Ser. No. 12/040,221, filed on even date, entitled "Method and Apparatus for Masking Debug Resources," naming William C. Moyer, Alistair P. Robertson, and Jimmy Gumulja as inventors, and assigned to the current assignee hereof.

BACKGROUND

1. Field

This disclosure relates generally to data processing systems, and more specifically, to a system and method for sharing debug resources.

2. Related Art

Software debuggers are commonly used within processors to perform various debug operations. Software debuggers typically use a variety of different resources to perform these debug operations, such as instruction breakpoints, data breakpoints, various execution event breakpoints, as well as control and status fields to configure the resources and to report status on various events. Errors may be present within software debuggers which may result, for example, in inaccurate debug operations. However, difficulties exist in actually debugging the software debuggers themselves.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIGS. 5 and 6 show, in a tabular form, functionality of a portion of the debug control register of FIG. 4, in accordance with one embodiment of the present invention.

FIG. 7 is a diagram of a debug status register associated with the debug registers of FIG. 3, in accordance with one embodiment of the present invention.

FIG. 8 shows, in a tabular form, functionality of a portion of the debug status register of FIG. 7, in accordance with one embodiment of the present invention.

FIG. 9 is a diagram of a debug resource control register associated with the data processing system of FIG. 1, in accordance with one embodiment of the present invention.

FIGS. 10-13 show, in tabular form, functionality of a portion of the debug resource control register of FIG. 9.

FIGS. 14-15 show, in tabular form, software accessible resources based on exemplary settings of the debug control register of FIG. 4 and the debug resource control register of FIG. 9.

FIG. 18 is a diagram illustrating an external debug command register, in accordance with one embodiment of the present invention.

FIG. 19 shows, in tabular form, functionality of a portion of the external debug command register of FIG. 18.

FIG. 20 illustrates, in tabular form, selected registers based on exemplary settings of the external debug command register.

DETAILED DESCRIPTION

Figure 1:
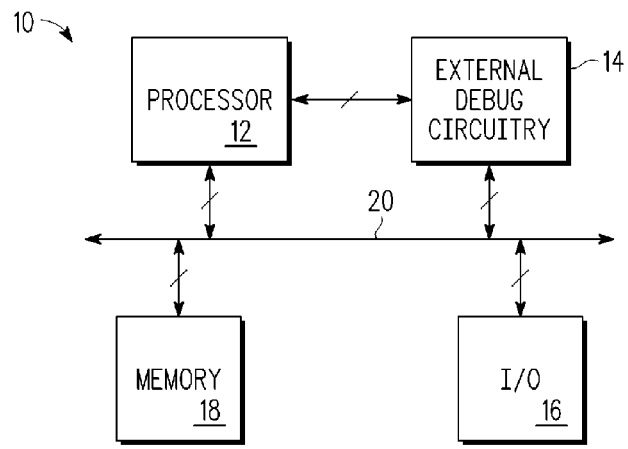
FIG. 1 is a block diagram of a data processing system, in accordance with one embodiment of the present invention.

In one embodiment, a common set of control and status registers are used by a hardware debugger and a software debugger for performing debug operations. However, rather than all debug resources having to be placed under hardware control exclusively or under software control exclusively, one embodiment provides for a sharing mechanism which allows for individualized and grouped resource allocation to be designated for either hardware or software use. For example, a debug resource control register allows debug control register fields to be selectively managed by software or hardware when one or more resources are shared between a software debugger and a hardware debugger. In one embodiment, a hardware debugger, when in external debug mode, allows software (via the debug resource control register) to manage one or more resources. In this case, events which are utilized by software may result in an interrupt which is handled by software, while events which are assigned to hardware result in entry into hardware debug mode (with notification of such entry to an external debugger via a debug port) in which operation of the processor is halted. Furthermore, one embodiment provides a consistency mechanism for software to be able to update registers and read correct (i.e. consistent) status, when only a subset of the debug resources are actually assigned by the hardware debugger to be made available for software use.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" or "0b" preceding a number indicates that the number is represented in its binary or base two form.

FIG. 1 illustrates a data processing system 10 consistent with an embodiment of the invention. Data processing system 10 may be a system-on-chip. Data processing system 10 may be implemented on a single integrated circuit or on a plurality of integrated circuits. Data processing system 10 includes a processor 12, an external debug circuitry 14, an I/O module 16, and a memory 18, which may be coupled via bus 20. In alternate embodiments, memory 18 may be any type of memory and may be located on the same integrated circuit as processor 12, or on a different integrated circuit than processor 12. Memory 18 may be any type of memory, such as, for example, a read only memory (ROM), a random access memory (RAM), non-volatile memory (e.g. Flash), etc. Also, memory 18 may be a memory or other data storage located within another peripheral or slave or on a different integrated circuit.

Figure 2:
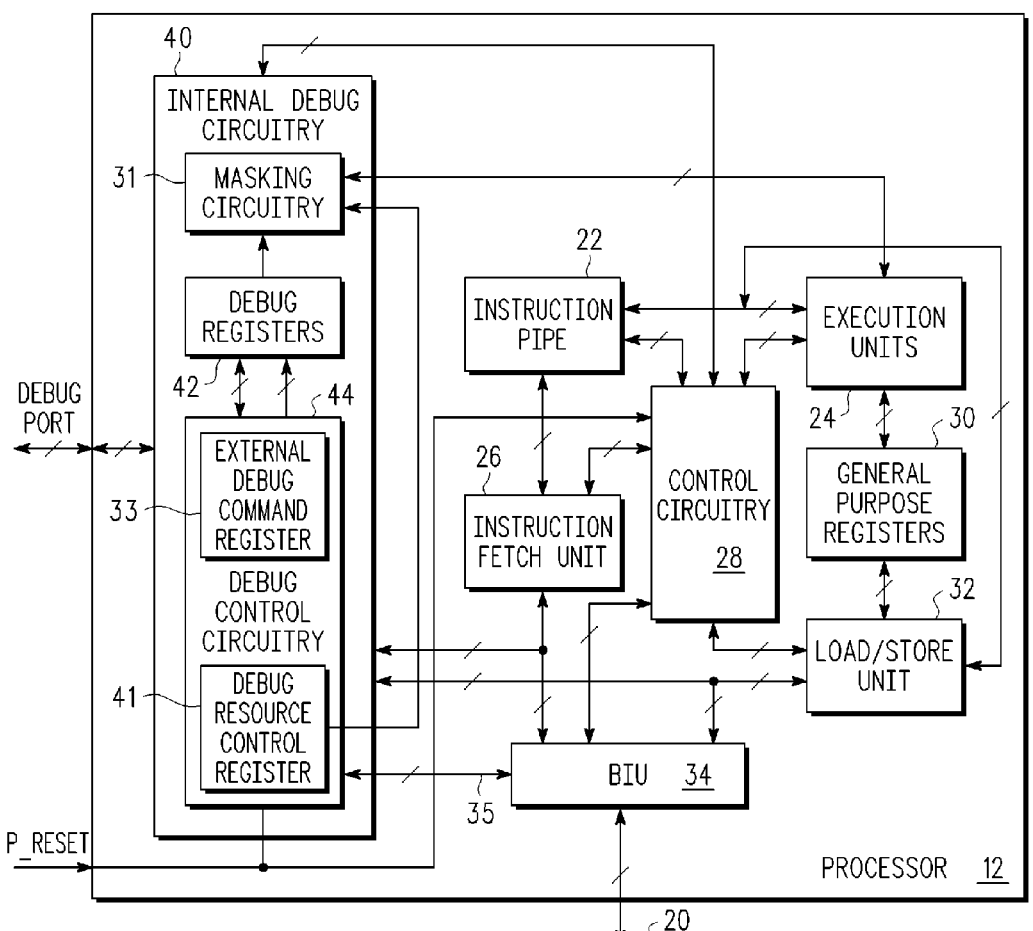
FIG. 2 is a block diagram of a processor associated with the data processing system of FIG. 1, in accordance with one embodiment of the present invention.

FIG. 2 is a block diagram of processor 12 associated with data processing system 10 of FIG. 1. Processor 12 may be implemented to perform operations in a pipelined fashion, and may include an instruction pipe 22, execution units 24, instruction fetch unit 26, control circuitry 28, general purpose registers 30, load/store unit 32, bus interface unit (BIU) 34 and internal debug circuitry 40. Processor 12 may communicate with other components of data processing system 10 via bus 20 coupled to BIU 34. Internal debug circuitry 40 may be coupled to external debugging units, such as an IEEE ISTO-5001 compliant Nexus™ debugging unit via debug port shown in FIG. 2. Nexus™ is a trademark of Freescale Semiconductor, Inc. located in Austin, Tex. The debug port may be implemented using a serial interface, such as an industry standard JTAG TAP conforming to IEEE 1149, or may be implemented as a parallel port, a combination of serial and parallel ports, or as an Ethernet port. Internal debug circuitry 40 may include masking circuitry 31, debug registers 42, and debug control circuitry 44. Debug control circuitry 44 may include an external debug command register 33 and a debug resource control register 41 (DBERC0). Masking circuitry 31 communicates with debug registers 42, execution units 24 and receives information from debug resource control register 41. Debug registers 42 may include bits grouped in fields for controlling various debug related events, including instruction breakpoints, data breakpoints, watchpoints, and other messaging associated with debugging. These debugging resources may be shared between processor 12 and external debug circuitry 14. Also, debug control circuitry 44 may communicate addresses and data with BIU 34 by way of conductors 35.

In one embodiment, note that a software debugger refers to software or debug software executed by processor 12 which performs debug operations. In one embodiment, a hardware debugger refers to external debug hardware or circuitry that is external to processor 12 and directs debug operations within processor 12. In one embodiment, a hardware debugger directs debug operation within processor 12 via a debug port or alternatively, via a set of one or more debug signals. Also, note that debug software may be referred to generically as software and the hardware debugger may be referred to generically as hardware.

Figure 3:
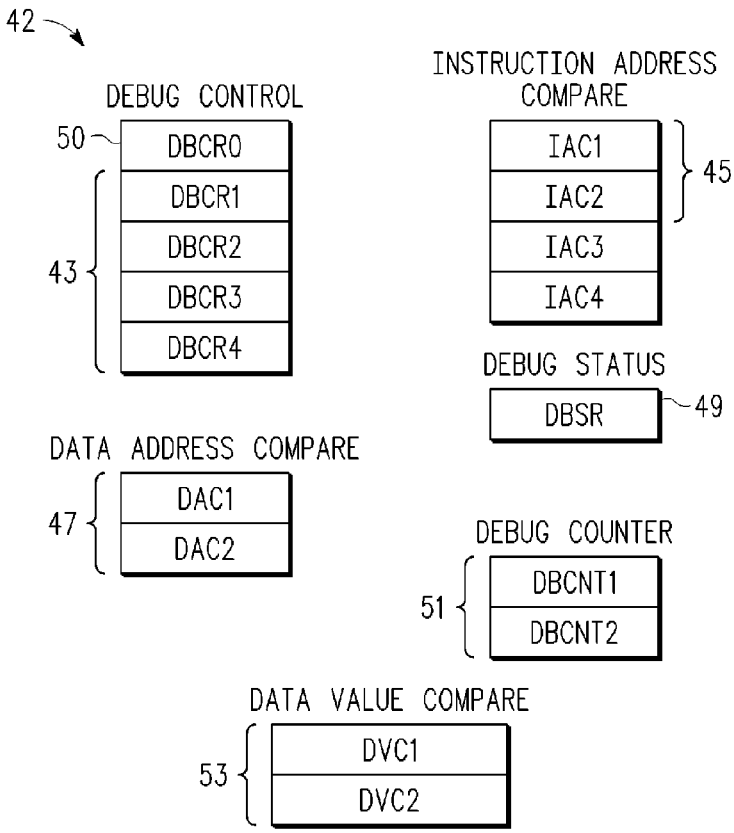
FIG. 3 is a diagram illustrating exemplary debug registers associated with the data processing system of FIG. 1.

Referring now to FIG. 3, registers within debug registers 42 may also be provided for storing one or more address comparison values, address ranges, and data match values for implementing instruction and/or data access breakpoint and watchpoint events, and other debug control criteria. These address and data values, along with various control criteria, are used to determine when processor 12 accesses one or more predetermined instruction addresses or data addresses for the purpose of generating a breakpoint or watchpoint event, which can cause processor 12 to begin exception processing for a debug exception when internal debug mode is active, or cause processor 12 to enter a debug halted mode in which it responds to commands provided by external debug circuitry 14 through the debug port of internal debug unit 40 (to, for example, external debug command register 33) when external debug mode is active. That is, debug registers 42 may be used to configure debug events. By way of example, debug registers 42 may include various debug control registers, including debug control register 50 (DBCR0) and other debug control registers 43 (DBCR1, DBCR2, DBCR3, and DBCR4). Debug registers 42 may further include instruction address compare registers 45 (IAC1 and IAC2). Instruction address compare registers 45 may store instruction addresses for address comparison purposes. Debug registers 42 may further include data address compare registers 47 (DAC1 and DAC2). Data address compare registers 47 may store data access addresses for address comparison purposes. Debug registers 42 may further include debug status register 49, debug counters 51 (DBCNT1 and DBCNT2), and data value compare registers 53 (DVC1 and DVC2). Debug registers 42 may be a part of the user's software programming model. Debug counters 51 may be configured to count-down when one or more count-enabled events occur. When a count value reaches zero, a debug count event may be signaled, and a debug interrupt may be generated, if enabled. Data value compare registers 53 may store data values for data comparison purposes.

In internal debug mode (when external debug mode is not enabled), these register resources are managed by software (e.g. by debug software or a software debugger running on processor 12), and no external debug circuitry usage is required. Software may configure the registers through data movement using move to and from special purpose register instructions which are programmers model software instructions to initialize the individual debug registers for performing software-based debugging activities, in which enabled debug events may cause software debug interrupts to occur. A software interrupt handler may then perform various desired activity which is determined by the software programmer of data processing system 10. In this internal debug mode, the debug resources of FIG. 3 are exclusively used and managed (i.e. owned) by software such that external debug hardware does not have access to these resources.

In external debug mode, external debug circuitry 14 (i.e. external debug hardware) is assigned exclusive ownership of the debug resources of FIG. 3, and when a configured debug event occurs, processor 12 may stop executing software instructions, and then enter a halted state and wait for a command to be provided by external debug circuitry 14 (where this halted state may also be referred to as hardware debug mode). Software (such as debug software executed by processor 12) no longer has control of the debug resources when external debug mode is enabled. External debug circuitry 14 may access the debug resources, including debug registers 42, directly via the debug port (as shown in FIG. 2), which may be, for example, implemented as a JTAG TAP port. In one embodiment, debug registers 42 may be mapped as JTAG data registers with register selection encodings contained within one or more fields for the various JTAG instructions, which provide for read and write accesses to the registers by the debugger through JTAG IR and DR operations. As will be described in more detail below, in external debug mode, external debug circuitry 14 is able to allow software on processor 12 (e.g. debug software or a software debugger running on processor 12) to selectively manage a subset of the debug resources. That is, external debug circuitry 14 is able to assign one or more debug resources, through the use of debug resource control register 41, to software to manage. For example, external debug circuitry 14 is able to allow particular debug control register fields within debug registers 42 to be managed by software. Debug events which are managed by debug software (e.g. a software debugger) result in an interrupt which is handled by software (assuming interrupts are enabled), while debug events which are managed by hardware (e.g. the external debug circuitry 14) result in entry into hardware debug mode in which processor 12 is halted and debugging is performed via the debug port by external debug circuitry 14. In this manner, debug control register fields and other debug resources can be selectively managed or owned by hardware or software when one or more resources are shared between a software debugger and a hardware debugger. Furthermore, by external debug circuitry 14 being able to assign one or more debug resources for use by debug software, external debug circuitry 14 is capable of debugging the debug software itself.

Note that, as used herein, debug resources may include more or less registers than those included in debug registers 42. For example, debug resources may include instruction breakpoints, data breakpoints, various execution event breakpoints, as well as control and status fields to configure the resources and to report status on various events. A debug resource may also include one or more particular fields of a debug register. Debug resources may also include counters and comparators, as needed, to perform the debug operations. Also, sharing of a common set of control and status registers (such as debug registers 42), rather than having duplicate sets for a hardware debugger and a software debugger to manage, requires fewer processor 12 resources to be implemented, and this simplifies the programming model for the user of data processing system 10. Internal debug unit 40 monitors activity within processor 12 and in response to detecting one or more predetermined conditions based on stored debug configuration information, may generate one or more data breakpoint events, instruction breakpoint events, instruction execution events such as a branch or trap taken event, an instruction completion event, and the like. In this manner of operation, processor 12 functions as can be appreciated by those skilled in the art.

Figure 4:
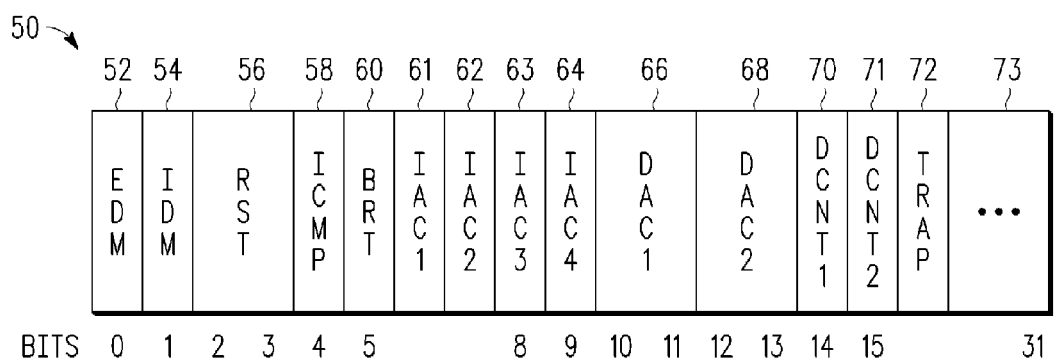
FIG. 4 is a diagram of a debug control register associated with the debug registers of FIG. 3, in accordance with one embodiment of the present invention.

FIG. 4 is a diagram of a debug control register 50 associated with the data processing system of FIG. 1. Debug control register 50 may be included as part of debug registers 42, which may further be included as part of internal debug unit 40. Debug control register 50 may be used to store debug configuration information. Although FIG. 4 illustrates a specific embodiment of the present invention which uses specific bit fields, alternate embodiments of the present invention may use different bit fields having different numbers of bits in each field. The specific bit fields depicted in FIG. 4 are shown only for illustrative purposes. By way of example, debug control register 50 may include 32 bits. Debug control register 50 may include bit fields labeled as: EDM 52, IDM 54, RST 56, ICMP 58, BRT 60, IAC1 61, IAC2 62, IAC3 63, IAC4 64, DAC1 66, DAC2 68, DCNT1 70, DCNT2 71, and TRAP 72. These bit fields are merely exemplary and debug control register 50 may include fewer or additional bit fields. In addition, these bit fields may be arranged differently. Also, note that each field may be referred to as a bit or bits or as a field. Debug control register 50 may also include reserved bit field 73 which may be used in the future. The functionality of the various bit fields is explained with respect to FIGS. 5 and 6 below. By way of example, debug control register 50 may be a writeable register that may also be readable and which may be part of the user's software programming model. In alternate embodiments of the present invention, debug control register 50 may not be a control register in the user's software programming model, but instead may be implemented outside of the user's software programming model. Any type of storage circuitry may be used to implement debug control register 50.

FIG. 5 shows, in a tabular form, functionality of a portion of debug control register 50 of FIG. 4. EDM bit 52 may indicate whether the external debug mode is enabled or disabled. When EDM bit 52 is set to 1, for example, control registers, such as debug control register 50 are placed under exclusive control of external debug circuitry 14 and data processing system 10 software cannot write information to these control registers. Alternatively, when EDM bit 52 is set to 1, software cannot write to specific portions of debug control registers. Additionally, EDM bit 52 is used to selectively block certain reset events from clearing information stored in debug control register 50 and other debug resources, which may contain debug control and setup information. Also, when EDM bit 52 is set to 1, debug resource control register 41 can be used by external debug circuitry 14 to allocate a subset of control register fields for software to manage. IDM bit 54 may indicate whether internal debug mode is enabled or disable, thus indicating whether debug exceptions are enabled or disabled. RST bits 56 may be used to control reset functions. ICMP bit 58 may be used to indicate whether instruction complete debug events are enabled or disabled. BRT bit 60 may be used to indicate whether branch taken debug events are enabled or disabled. IAC1 bit 61 may be used to indicate whether instruction address compare 1 debug events are enabled or disabled. IAC2 bit 62 may be used to indicate whether instruction address compare 2 debug events are enabled or disabled. IAC3 bit 63 may be used to indicate whether instruction address compare 3 debug events are enabled or disabled. IAC4 bit 64 may be used to indicate whether instruction address compare 4 debug events are enabled or disabled.

With reference now to FIG. 6, FIG. 6 shows, in a tabular form, functionality of a portion of the debug control register 50 of FIG. 4. DAC1 bits 66 may be used to indicate whether data address compare 1 debug events are enabled or disabled. If enabled, DAC1 bits 66 also indicates for which type of storage accesses data address compare 1 debug events are enabled (for example, for store-type data storage accesses, for load-type data storage accesses, or for either load-type or store-type data storage accesses). DAC2bits 68 may be used to indicate whether data address compare 2 debug events are enabled or disabled. If enabled, DAC2bits 68 also indicates for which type of storage accesses data address compare 1 debug events are enabled (for example, for store-type data storage accesses, for load-type data storage accesses, or for either load-type or store-type data storage accesses). DCNT1 bit 70 may be used to indicate whether a debug counter 1 debug event is enabled or not. DCNT2 bit 71 may be used to indicate whether a debug counter 2 debug event is enabled or not. TRAP bit 72 may be used to indicate whether a trap taken debug event is enabled or not. Bits 73 (17:31) may be reserved for future use. Although FIGS. 5 and 6 describe a specific number of bit fields for providing different configuration information associated with debug events, different number of bit fields than shown in these figures may also be used.

FIG. 7 is a diagram of a debug status register 49 associated with the data processing system of FIG. 1. Debug status register 49 may be included as part of debug registers 42, which may further be included as part of internal debug unit 40. Debug status register 49 may be used to store status information on debug events. In one embodiment, when a bit in the debug status register 49 is set to '1', a corresponding control signal is generated which is used to either signal entry into a debug halted mode (for hardware debug events) or is used to generate a debug interrupt request to the processor (for software debug events). Although FIG. 7 illustrates a specific embodiment of the present invention which uses specific bit fields, alternate embodiments of the present invention may use different bit fields having different numbers of bits in each field. The specific bit fields depicted in FIG. 7 are shown only for illustrative purposes. By way of example, debug status register 49 may include 32 bits. Debug status register 49 may include bit fields labeled as: IDE 76, ICMP 78, BRT 80, IAC1 82, IAC2 84, IAC3 86, IAC4 88, DAC1R 90, DAC1W 92, DAC2R 94, DAC2W 96, TRAP 97, DCNT1 98, DCNT2 99, and software dedicated bits 101. These bit fields are merely exemplary and debug status register 49 may include fewer or additional bit fields. In addition, these bit fields may be arranged differently. Also, note that each field may be referred to as a bit or bits or as a field. Debug status register 49 may also include reserved bit fields 100, which may be used in the future. The functionality of the various bit fields is explained with respect to FIG. 8 below. Also, in referring to debug status register 49, setting a bit refers to storing a logic level one and clearing a bit refers to storing a logic level zero. By way of example, debug status register 49 may be a register whose bits are set via hardware, and read and cleared via software and which may be part of the user's software programming model. In alternate embodiments of the present invention, debug status register 49 may not be in the user's software programming model, but instead may be implemented outside of the user's software programming model. In one embodiment, debug status bits of debug status register 49 are set by debug events only while internal debug mode is enabled or external debug mode is enabled. In one embodiment, when debug interrupts are enabled in internal debug mode, a set bit in debug status register 49 may cause a debug interrupt to be generated, where the debug interrupt handler is responsible for clearing debug status register 49 bits prior to returning to normal execution. In one embodiment, when in external debug mode, the debug status bits of debug status register 49 are set by the hardware-owned debug events. If hardware has assigned any resources to software, then the debug status bits corresponding to those assigned resources are set by software-owned debug events, where, if interrupts are enabled, a set bit owned by software may cause an interrupt request signal to be generated and a debug interrupt to be taken and handled by software. Correspondingly, a set bit owned by hardware may cause a debug mode request signal to be generated and entry into a debug halted mode to occur, and be handled by the hardware debugger. (Note that hardware-owned resources may also be referred to as hardware-managed resources and software-owned resources may also be referred to as software-managed resources.) Furthermore, any type of storage circuitry may be used to implement debug status register 49.

FIG. 8 shows, in a tabular form, functionality of debug status register 49 of FIG. 7. IDE bit 76 is used to indicate occurrence of an imprecise debug event and thus may be set to one if debug exceptions are disabled and a debug event causes its respective debug status register bit to be set to one. That is, although a debug event may occur, debug exceptions may remain disabled because an interrupt cannot yet occur due to a current state of the processor 12 pipeline. ICMP bit 78 may be set to one if an instruction complete debug event occurred. BRT bit 80 may be set to one if a branch taken debug event occurred. IAC1 bit 82 may be set to one if an IAC1 debug event occurred. IAC2 bit 84 may be set to one if an IAC2 debug event occurred. IAC3 bit 86 may be set to one if an IAC3 debug event occurred. IAC4 bit 88 may be set to one if an IAC4 debug event occurred. DAC1 R bit 90 may be set to one if a read-type DAC1 debug event occurred while DAC1 bits 66 equal %10 or %11 (indicating that DAC1 debug events are enabled for load-type data storage accesses, as shown in FIG. 6). DAC1 W bit 92 may be set to one if a write-type DAC1 debug event occurred while DAC1 bits 66 equal %01 or %11 (indicating that DAC1 debug events are enabled for store-type data storage accesses, as shown in FIG. 6). DAC2 R bit 94 may be set to one if a read-type DAC2debug event occurred while DAC2bits 68 equal %10 or %11 (indicating that DAC2debug events are enabled for load-type data storage accesses, as shown in FIG. 6). DAC2 W bit 96 may be set to one if a write-type DAC2debug event occurred while DAC2bits 68 equal %01 or %11 (indicating that DAC2debug events are enabled for store-type data storage accesses, as shown in FIG. 6). TRAP bit 97 may be set to one if a trap taken debug event occurred. DCNT1 bit 98 may be set to 1 if a DCNT 1 debug event occurred. DCNT2 bit 99 may be set to one if a DCNT 2 debug event occurred. In one embodiment, bits 14 to 29 are reserved for possible future use. Also, in one embodiment, bits 101 are software dedicated bits, in which only software is able to access them.

FIG. 9 is a diagram of debug resource control register 41 associated with the data processing system of FIG. 1. Debug resource control register 41 may be used to control resource allocation when external debug mode is enabled (e.g. when EDM bit 52 of debug control register 50 is set to 1). Debug resource control register 41 provides a mechanism for the hardware debugger (e.g. external debug circuitry 14) to share debug resources with software. Individual resources are allocated based on the settings of debug resource control register 41 when external debug mode is enabled. In one embodiment, when external debug mode is enabled (e.g. when EDM bit 52 of debug control register 50 is set to 1), the debug resources (e.g. debug registers 42) are initially placed under sole control of the hardware debugger and software can no longer write to these resources. The hardware debugger can then assign one or more resources back to software via debug resource control register 41 while retaining usage of the remaining resources. In this manner, debug operations directed by debug software and debug operations directed by the external debug hardware can contemporaneously occur in external debug mode. That is, the hardware debugger and the software debugger can operate contemporaneously. When external debug mode is disabled (e.g. when EDM bit 52 of debug control register 50 is set to 0), the settings in debug resource control register 41 are ignored.

In one embodiment, hardware-owned resources which generate debug events cause entry into hardware debug mode, while software-owned resources which generate debug events act as if they occurred in internal debug mode, thus causing debug interrupts to occur if IDM bit 54 is set to 1 and if interrupts are enabled. In one embodiment, debug resource control register 41 is controlled via the debug port and is read-only to software. Also, debug status bits in debug status register 49 are set by software-owned debug events only while internal debug mode is enabled. That is, when debug interrupts are enabled (and when IDM bit 54 in debug control register 50 is set to 1 and EDM bit 52 in debug control register 50 is set to 0, or when both IDM bit 54 and EDM bit 52 in debug control register 50 are set to 1 and software is allocated one or more debug resources via debug resource control register 41), a set bit in debug status register 49 which corresponds to a software-owned debug event will cause a debug interrupt to be generated.

Although FIG. 9 illustrates a specific embodiment of the present invention which uses specific bit fields, alternate embodiments of the present invention may use different bit fields having different numbers of bits in each field. The specific bit fields depicted in FIG. 9 are shown only for illustrative purposes. Furthermore, as with any of the registers described herein, more or less registers may be used to store the data. By way of example, debug resource control register 41 may include 32 bits. Debug resource control register 41 may include bit fields labeled as: IDM 112, RST 114, UDE 116, ICMP 118, BRT 120, IRPT 122, TRAP 124, IAC1 126, IAC2 128, IAC3 130, IAC4 132, DAC1 134, DAC2 138, RET 142, DEVT1 146, DEVT2 148, DCNT1 150, DCNT2 152, CIRPT 154, CRET 156 BKPT 158, and FT 162. These bit fields are merely exemplary and debug resource control register 41 may include fewer or additional bit fields. In addition, these bit fields may be arranged differently. Also, note that each field may be referred to as a bit or bits or as a field. Debug resource control register 41 may also include reserved bit fields 110, 136, 140, 144, and 160, which may be used in the future. The functionality of the various bit fields is explained with respect to FIGS. 10-13 below.

FIG. 10 shows, in a tabular form, functionality of a portion of debug resource control register 41 (DBERC0) of FIG. 9. IDM bit 112 provides internal debug mode control. When IDM bit 112 is set to 0, internal debug mode may not be enabled by software. That is, IDM bit 54 in debug control register 50 (DBCR0) is owned exclusively by hardware. A Move to Special Purpose Register (mtspr) instruction to debug control registers 50 and 43 (DBCR0-DBCR4), to debug counter registers 51 (DBCNT1 and DBCNT2), or to debug status register 49 (DBSR) is always ignored. Also, no resource sharing occurs, regardless of the setting of other fields in DBERC0 41. That is, hardware exclusively owns all resources. Also, a Move from Special Purpose Register (mfspr) instruction from any of debug registers 42 by software returns 0. When IDM bit 112 is set to 1, internal debug mode may be enabled by software. That is, IDM bit 54 in DBCR0 50 and IDE bit 76 in DBSR 49 are owned by software and are thus software readable/writeable. Also, hardware-managed status and control bits in DBSR 49 are masked from software access and read as 0, and software writes to hardware-managed bits in DBCR0-DBCR4, DBCNT, and DBSR via an mtspr instruction are ignored. Note that by setting IDM bit 112 to 1, hardware is able to assign resources for use by software, where these resources assigned to software may be defined by the other fields in DBERC0 41. RST bit 114 provides reset field control. When RST bit 114 is set to 0, RST bits 56 of DBCR0 50 are owned exclusively by hardware.

Also, no mtspr access by software to RST bits 56 is allowed, and an mfspr access by software returns 0. When RST bit 114 is set to 1, RST bits 56 of DBCR0 50 are accessible by a software debugger. That is, RST bits 56 are software readable and writeable.

Still referring to FIG. 10, UDE bit 116 allows for the assignment of ownership (or management) of an unconditional debug event to software. When UDE bit 116 is set to 0, the unconditional debug event is owned by the hardware debugger. Software cannot access the UDE field in DBSR 49 (UDE field not shown) via an mtspr instruction and an mfspr access by software returns 0. When UDE bit 116 is set to 1, the unconditional debug event is owned by the software debugger. In this case, the UDE field in DBSR 49 is software readable and writeable. ICMP bit 118 allows for the assignment of ownership (or management) of an instruction complete debug event to software. When ICMP bit 118 is set to 0, the instruction complete debug event is owned by the hardware debugger. There is no mtspr access by software to ICMP field 58 in DBCR0 50 or ICMP field 78 in DBSR 49, and an mfspr access by software returns 0. When ICMP bit 118 is set to 1, the instruction complete debug event is owned by the software debugger. In this case, ICMP field 58 in DBCR0 50 and ICMP field 78 in DBSR 49 are software readable and writeable. BRT bit 120 allows for the assignment of ownership (or management) of a branch taken debug event to software. When BRT bit 120 is set to 0, the branch taken debug event is owned by the hardware debugger. There is no mtspr access by software to BRT field 60 in DBCR0 50 or BRT field 80 in DBSR 49, and an mfspr access by software returns 0. When BRT bit 120 is set to 1, the branch taken debug event is owned by the software debugger. In this case, BRT field 60 in DBCR0 50 and BRT field 80 in DBSR 49 are software readable and writeable.

FIG. 11 shows, in a tabular form, functionality of a portion of debug resource control register 41 (DBERC0) of FIG. 9. IRPT bit 122 allows for the assignment of ownership (or management) of an interrupt taken debug event to software. When IRPT bit 122 is set to 0, the interrupt taken debug event is owned by the hardware debugger. There is no mtspr access by software to an IRPT field (not shown) in DBCR0 50 or an IRPT field (not shown) in DBSR 49, and an mfspr access by software returns 0. When IRPT bit 122 is set to 1, the interrupt taken debug event is owned by the software debugger. In this case, the IRPT field in DBCR0 and the IRPT field in DBSR 49 are software readable and writeable. TRAP bit 124 allows for the assignment of ownership (or management) of a trap taken debug event to software. When TRAP bit 124 is set to 0, the trap taken debug event is owned by the hardware debugger. There is no mtspr access by software to TRAP field 72 in DBCR0 50 or TRAP field 97 in DBSR 49, and an mfspr access by software returns 0. When TRAP bit 124 is set to 1, the trap taken debug event is owned by the software debugger. In this case, the TRAP field 72 in DBCR0 and TRAP field 97 in DBSR 49 are software readable and writeable.

Still referring to FIG. 11, IAC1 bit 126 allows for the assignment of ownership (or management) of instruction address compare 1 debug event to software. When IAC1 bit 126 is set to 0, the instruction address compare 1 debug event is owned by the hardware debugger. There is no mtspr access by software to IAC1 control and status fields (e.g. IAC1 field 61 in DBCR0 50 and IAC1 field 82 in DBSR 49), and an mfspr access by software returns 0. When IAC1 bit 126 is set to 1, the instruction address compare 1 debug event is owned by the software debugger. In this case, the IAC1 control and status fields (e.g. IAC1 field 61 in DBCR0 and IAC1 field 82 in DBSR 49) are software readable and writeable. IAC2 bit 128 allows for the assignment of ownership (or management) of instruction address compare 2 debug event to software. When IAC2 bit 128 is set to 0, the instruction address compare 2 debug event is owned by the hardware debugger. There is no mtspr access by software to IAC2 control and status fields (e.g. IAC2 field 62 in DBCR0 50 and IAC2 field 84 in DBSR 49), and an mfspr access by software returns 0. When IAC2 bit 128 is set to 1, the instruction address compare 2 debug event is owned by the software debugger. In this case, the IAC2 control and status fields (e.g. IAC2 field 62 in DBCR0 and IAC2 field 84 in DBSR 49) are software readable and writeable. IAC3 bit 130 allows for the assignment of ownership (or management) of instruction address compare 3 debug event to software. When IAC3 bit 130 is set to 0, the instruction address compare 3 debug event is owned by the hardware debugger. There is no mtspr access by software to IAC3 control and status fields (e.g. IAC3 field 63 in DBCR0 50 and IAC3 field 86 in DBSR 49), and an mfspr access by software returns 0. When IAC3 bit 130 is set to 1, the instruction address compare 3 debug event is owned by the software debugger. In this case, the IAC3 control and status fields (e.g. IAC3 field 63 in DBCR0 and IAC3 field 86 in DBSR 49) are software readable and writeable. IAC4 bit 132 allows for the assignment of ownership (or management) of instruction address compare 4 debug event to software. When IAC4 bit 132 is set to 0, the instruction address compare 4 debug event is owned by the hardware debugger. There is no mtspr access by software to IAC4 control and status fields (e.g. IAC4 field 64 in DBCR0 50 and IAC4 field 88 in DBSR 49), and an mfspr access by software returns 0. When IAC4 bit 132 is set to 1, the instruction address compare 4 debug event is owned by the software debugger. In this case, the IAC4 control and status fields (e.g. IAC4 field 64 in DBCR0 and IAC4 field 88 in DBSR 49) are software readable and writeable.

FIG. 12 shows, in a tabular form, functionality of a portion of debug resource control register 41 (DBERC0) of FIG. 9. DAC1 bit 134 allows for the assignment of ownership (or management) of data address compare 1 debug event to software. When DAC1 bit 134 is set to 0, the data address compare 1 debug event is owned by the hardware debugger. There is no mtspr access by software to DAC1 control and status fields (e.g. DAC1 field 66 in DBCR0 50 and DAC1 R field 90 and DAC1 W field 92 in DBSR 49), and an mfspr access by software returns 0. When DAC1 bit 134 is set to 1, the data address compare 1 debug event is owned by the software debugger. In this case, the DAC1 control and status fields (e.g. DAC1 field 66 in DBCR0 50 and DAC1 R field 90 and DAC1 W field 92 in DBSR 49) are software readable and writeable. DAC2bit 138 allows for the assignment of ownership (or management) of data address compare 2 debug event to software. When DAC2bit 138 is set to 0, the data address compare 2 debug event is owned by the hardware debugger. There is no mtspr access by software to DAC2control and status fields (e.g. DAC2field 68 in DBCR0 50 and DAC2 R field 94 and DAC2 W field 96 in DBSR 49), and an mfspr access by software returns 0. When DAC2bit 138 is set to 1, the data address compare 2 debug event is owned by the software debugger. In this case, the DAC2control and status fields (e.g. DAC2field 68 in DBCR0 50 and DAC2 R field 94 and DAC2 W field 96 in DBSR 49) are software readable and writeable.

Still referring to FIG. 12, RET bit 142 allows for the assignment of ownership (or management) of a return debug event to software. When RET bit 142 is set to 0, the return debug event is owned by the hardware debugger. There is no mtspr access by software to a RET field (not shown) in DBCR0 50 and a RET field (not shown) in DBSR 49, and an mfspr access by software returns 0. When RET bit 142 is set to 1, the return debug event is owned by the software debugger. In this case, the RET field in DBCR0 50 and the RET field in DBSR 49 are software readable and writeable. DEVT1 bit 146 allows for the assignment of ownership (or management) of an external debug event 1 debug event to software. When DEVT1 bit 146 is set to 0, the external debug event 1 debug event is owned by the hardware debugger. There is no mtspr access by software to a DEVT1 field (not shown) in DBCR0 50 and a DEVT1 field (not shown) in DBSR 49, and an mfspr access by software returns 0. When DEVT1 bit 146 is set to 1, the external debug event 1 debug event is owned by the software debugger. In this case, the DEVT1 field in DBCR0 50 and the DEVT1 field in DBSR 49 are software readable and writeable. DEVT2 bit 148 allows for the assignment of ownership (or management) of an external debug event 2 debug event to software. When DEVT2 bit 148 is set to 0, the external debug event 2 debug event is owned by the hardware debugger. There is no mtspr access by software to a DEVT2 field (not shown) in DBCR0 50 and a DEVT2 field (not shown) in DBSR 49, and an mfspr access by software returns 0. When DEVT2 bit 148 is set to 1, the external debug event 2 debug event is owned by the software debugger. In this case, the DEVT2 field in DBCR0 50 and the DEVT2 field in DBSR 49 are software readable and writeable.

FIG. 13 shows, in a tabular form, functionality of a portion of debug resource control register 41 (DBERC0) of FIG. 9. DCNT1 bit 150 allows for the assignment of ownership (or management) of debug counter 1 debug event to software. When DCNT1 bit 150 is set to 0, the debug counter 1 debug event is owned by the hardware debugger. There is no mtspr access by software to counter 1 control and status fields (e.g. DCNT1 field 70 in DBCR0 50 and DCNT1 field 98 in DBSR 49), and an mfspr access by software returns 0. When DCNT1 bit 150 is set to 1, the debug counter 1 debug event is owned by the software debugger. In this case, the counter 1 control and status fields (e.g. DCNT1 field 70 in DBCR0 50 and DCNT1 field 98 in DBSR 49) are software readable and writeable. DCNT2 bit 152 allows for the assignment of ownership (or management) of debug counter 2 debug event to software. When DCNT2 bit 152 is set to 0, the debug counter 2 debug event is owned by the hardware debugger. There is no mtspr access by software to counter 2 control and status fields (e.g. DCNT2 field 71 in DBCR0 50 and DCNT2 field 99 in DBSR 49), and an mfspr access by software returns 0. When DCNT2 bit 152 is set to 1, the debug counter 2 debug event is owned by the software debugger. In this case, the counter 2 control and status fields (e.g. DCNT2 field 71 in DBCR0 50 and DCNT2 field 99 in DBSR 49) are software readable and writeable. CIRPT bit 154 allows for the assignment of ownership (or management) of critical interrupt taken debug event to software. When CIRPT bit 154 is set to 0, the critical interrupt taken debug event is owned by the hardware debugger. There is no mtspr access by software to a CIRPT field (not shown) in DBCR0 50 and a CIRPT field (not shown) in DBSR 49, and an mfspr access by software returns 0. When CIRPT bit 154 is set to 1, the critical interrupt taken debug event is owned by the software debugger. In this case, the CIRPT field in DBCR0 50 and the CIRPT field in DBSR 49 are software readable and writeable. CRET bit 156 allows for the assignment of ownership (or management) of critical return debug event to software. When CRET bit 156 is set to 0, the critical return debug event is owned by the hardware debugger. There is no mtspr access by software to a CRET field (not shown) in DBCR0 50 and a CRET field (not shown) in DBSR 49, and an mfspr access by software returns 0. When CRET bit 156 is set to 1, the critical return debug event is owned by the software debugger. In this case, the CRET field in DBCR0 50 and the CRET field in DBSR 49 are software readable and writeable.

Still referring to FIG. 13, BKPT bit 158 provides breakpoint instruction debug control. When BKPT bit 158 is set to 0, the breakpoint is owned by hardware. Execution of a breakpoint (bkpt) instruction (an instruction with all 0's opcode) results in entry into debug mode in which a hardware debugger can direct debug operations. When BKPT bit 158 is set to 1, the breakpoint is owned by the software debugger. Execution of a bkpt instruction results in an illegal instruction exception. FT bit 162 provides freeze timer debug control. When FT bit 162 is set to 0, an FT field (not shown) of DBCR0 50 is owned by the hardware debugger with no access allowed by software. When FT bit 162 is set to 1, the FT field is owned by the software debugger and is therefore software readable and writeable. In FIGS. 10-13, bit fields 110, 136, 140, 144, and 160 may be reserved for future use.

Therefore, as described above, when processor 12 initially enters the external debug mode, all resources are exclusively assigned to the hardware debugger (e.g. external debug circuitry 14). However, through the use of debug resource control register 41, the hardware (e.g. the hardware debugger) can assign resources back to the software (e.g. the software debugger) for exclusive use by the software. That is, the external debug hardware can enable availability of a first portion of the debug resources for use by the debug software where a second portion of the debug resources are committed for exclusive use by the external debug hardware (where the first and second portions are mutually exclusive). As seen in the descriptions of FIGS. 10-13, by assigning a debug event or control to software, software has access to those resources necessary to manage that debug event or control. In one embodiment, software is given access only to those resources necessary to manage that debug event or control. For example, if hardware sets each of bits IAC1 bit 126 and IAC2 bit 128 to a 1 (and sets IDM bit 112 to a 1 to allow for the sharing of resources), those status and control registers, and any other resources, necessary for managing those instruction address compare debug events are assigned to software. For example, software would have access to IAC1 field 61 and IAC2 field 62 in DBCR0 50, to IAC1 field 82 and IAC2 field 84 in DBSR 49, and to IAC1 and IAC2 registers 45. In this manner, software can then enable either an IAC1 or an IAC2 debug event (or both debug events) by setting the appropriate IAC1 field 61, IAC2 field 62, and IAC registers 45, as needed, to configure the debug events. However, if the rest of the bit fields in DBERC0 remain set to 0, then hardware has exclusive use of the remaining resources. In this manner, the hardware debugger and software debugger may contemporaneously perform debug operations during external debug mode where the software debugger is limited to accessing only those resources that were assigned by the hardware debugger. Furthermore, debug software running on processor 12 would not be able to access any of the other resources which remain exclusively owned by the hardware. Therefore, note that debug software, in being assigned ownership of a debug event, is given access to particular registers or to particular fields of registers, as needed. In this manner, the hardware debugger is able to enable availability of a first portion of the debug resources for use by debug software while committing to itself a second portion of the debug resources, where the first and second portions are mutually exclusive.

FIGS. 14 and 15 illustrate, in tabular form, which resources are software accessible in response to particular settings of DBERC0 41. Referring to row 172, note that if external debug mode is not enabled (if EDM bit 52 is set to 0), all resources are exclusively owned and thus accessible by software. For the remaining rows of FIGS. 14 and 15, as shown in rows 176, 178, 180, 182, 184, 186, 188, 190, 192, 194, 196, 198, 200, 202, 204, 206, 208, and 210, external debug mode is enabled (EDM bit 52 is set to 1) and IDM bit 112 of DBERC0 41 is set to 1, such that the remaining fields of DBERC0 41 assign particular resources to software. For example, in order to allow software to own the instruction address compare 1 and 2 debug events (as was discussed in the example of the previous paragraph), the settings of row 186 or row 188 or both could be used, where the column entitled "software accessible" indicates which debug resources are available for use by software based on which of IAC1 bit 126 or IAC2 bit 128 of DBERC0 41 are set to 1. Note that other fields in other debug control registers 43 (such as IAC1 US and IAC1 ER fields of DBCR1) can be assigned for use by software in addition to those fields discussed in reference to DBCR0 50.

Figure 16:
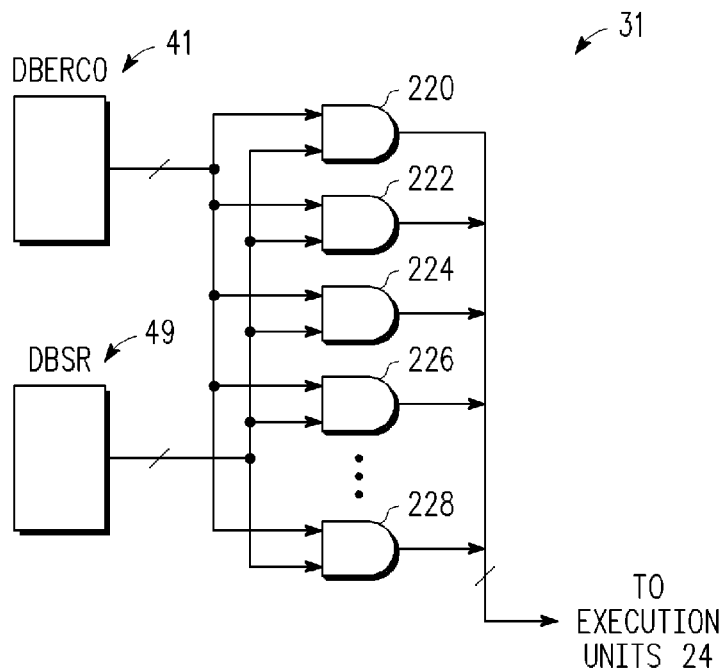
FIGS. 16-17 show, in partial schematic and partial block diagram form, portions of masking circuitry associated with the processor of FIG. 2, in accordance with one embodiment of the present invention.
Figure 17:
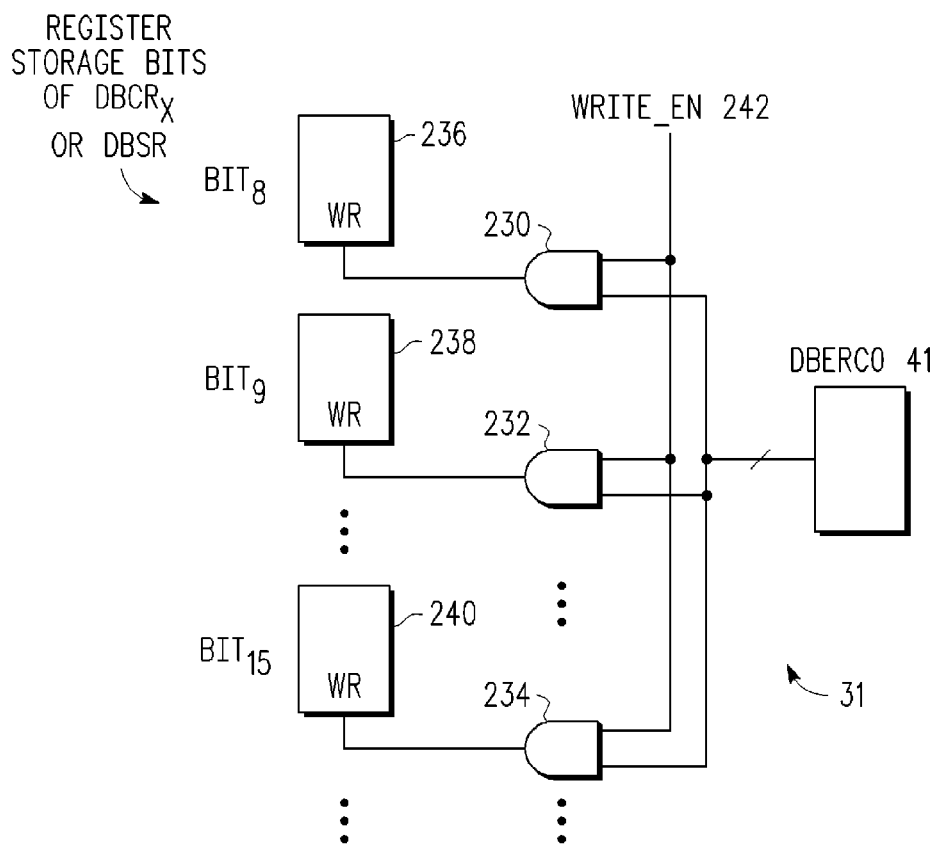

FIGS. 16 and 17 illustrate portions of masking circuitry 31, in accordance with one embodiment of the present invention. FIG. 16 illustrates a portion of the read path from debug registers 42 to execution units 24, such as when executing a mfspr instruction. As described above in reference to FIGS. 10-13, when a bit field corresponding to a particular debug event is not asserted, the particular debug event is hardware-owned in which an mfspr access by software returns a 0. However, when the bit field corresponding to a particular debug event is asserted, the particular debug event is software-owned in which it is readable and writeable by software. In this manner, portions of DBSR 49 can be prevented from being read by the debug software during execution of the debug software. Therefore, referring to FIG. 16, each AND gate 220, 222, 224, 226, and 228 receives a first bit input from DBERC0 41 and a corresponding second bit input from DBSR 49. That is, each AND gate receives a bit field from DBERC0, which, for example, corresponds to a particular debug event and also receives the bit field from DBSR 49 which corresponds to that particular debug event (i.e. which reports the result of that particular debug event). For example, AND gate 222 may receive IAC1 bit 126 from DBERC0 41 as a first input and IAC1 bit 82 from DBSR 49 as a second input. If the input from DBERC0 41 to an AND gate is a "1" (indicating that the corresponding debug event is software-owned), the output of that AND gate will reflect the value of the corresponding bit field from DBSR 49 which is provided as the second input to the AND gate. However, if the input from DBERC0 41 to an AND gate is a "0", then regardless of the value input from DBSR 49, the output of the AND gate will be 0. In this manner, an mfspr access will always return a zero when the corresponding bit in DBERC0 41 is negated.

FIG. 17 illustrates a portion of the write path execution units 24 to debug registers 42. As described above in reference to FIGS. 10-13, when a bit field corresponding to a particular debug event is not asserted, the particular debug event is hardware-owned in which there is no mtspr access by software. That is, software cannot write to the bit field. However, when the bit field corresponding to a particular debug event is asserted, the particular debug event is software-owned in which it is readable and writeable by software. Therefore, referring to FIG. 17, each AND gate 230, 232, and 234 receives a write_en signal 242 as a first input and a corresponding bit input from DBERC0 41. In this manner, only when the corresponding bit input from DBERC0 41 is asserted can the corresponding bit field (e.g. $BIT_8$, $BIT_9$, and $BIT_{15}$) be written to by software. That is, when the corresponding bit input from DBERC0 41 is not asserted, then the corresponding bit field cannot be written to. Note that $BIT_8$, $BIT_9$, and $BIT_{15}$ stored in storage circuits 236, 238, and 240, respectively, correspond to bit field locations 8, 9, and 15 of a debug control register (such as DBCR0-DBCR4) or of DBSR 49. That is, AND gates such as AND gates 230, 232, and 234 may be present in the write path to the registers, as needed, in debug registers 42. For example, storage circuit 236 may correspond to the register storage bit of IAC3 bit field 63 of DBCR0 50 (where IAC3 bit field 63 is stored in bit field location 8 of DBCR0 50). If storage circuit 236 corresponds to a register storage bit of DBSR 49, then storage circuit 236 may correspond to the register storage bit of DAC1 W bit field 92 (where DAC1 W bit field 92 is stored in bit field location 8 of DBSR 49).

In one embodiment, each field in DBSR 49 may be referred to as a status flag, where those fields corresponding to a hardware-owned debug events may be referred to as hardware status flags and those fields corresponding to a software-owned debug event may be referred to as software status flags. Note that the setting and clearing of hardware status flags arise from running the hardware debugger while the setting and clearing of software status flags, if any, arise from running the debug software. Masking circuitry 31 therefore masks locations in DBSR 49 where the hardware status flags are located from being read by the debug software while allowing both the hardware status flags and the software status flags to be read by the hardware debugger. Note that the functionality of masking circuitry 31 can be implemented in a variety of different ways using a variety of different circuitry to mask locations in the debug status register.

FIG. 18 illustrates one embodiment of external debug command register 33 of FIG. 2. External debug command register 33 receives debug commands via the debug port from a hardware debugger, such as, for example, external debug circuitry 14. External debug command register 33 includes a read/write command field 250 and a register select field 254. In the illustrated embodiment, read/write command field 250 is a single bit field and register select field 254 includes 7 bits. External debug command register 33 may also include bits 252 reserved for future use. Although FIG. 18 illustrates a specific embodiment of the present invention which uses specific bit fields, alternate embodiments of the present invention may use different bit fields having different numbers of bits in each field. The specific bit fields depicted in FIG. 18 are shown only for illustrative purposes. Furthermore, as with any of the registers described herein, more or less registers may be used to store the data. By way of example, external debug command register 33 may include 10 bits.

FIG. 19 shows, in a tabular form, functionality of external debug command register 33 of FIG. 18, in accordance with one embodiment of the present invention. Read/write command bit 250 specifies the direction of data transfer. If the read/write command bit is 0, then the data associated with the external debug command is written into the register specified by register select field 254. If the read/write command bit is 1, then the data contained in the register specified by register select field 254 is read. In one embodiment, the read/write command bit is ignored for read-only or write-only registers. Register select field 254 defines which register is the source register for a read operation or the destination register for a write operation. In one embodiment, attempted writes to read-only registers are ignored.

FIG. 20 illustrates, in tabular form, register addresses which may be used in register select field 254, in accordance with one embodiment of the present invention. Alternate embodiments may define the register addresses differently. For example, referring to FIG. 20, a value of 0100000 for register select field 254 indicates IAC! register in debug registers 42, as illustrated in row 276. As illustrated in row 298, a value of 0110000 for register select field 254 indicates DBSR register 49. Therefore, each of rows 266, 276, 278, 280, 282, 284, 286, 288, 290, 294, 298, 300, 302, 304, 306, and 310 illustrate the different values for register select field 254 which indicate the JTAG ID register, IAC1 register, IAC2 register, IAC3 register, IAC4 register, DAC1 register, DAC2register, DVC1 register, DVC2 register, DBCNT register, DBSR register, DBCR0-3 registers, and the DBERC0 register, respectively. Therefore, in external debug mode, external debug circuitry 14 can provide a command to external debug command register 33 via the debug port. For example, in external debug mode, if the hardware debugger wants to assign debug resources to software, it can provide a command in which the read/write command field is set to 0 and register select field is set to 0111111 (as illustrated in row 310). The hardware debugger can then write the desired value to DBERC0 41 via the debug port.

As described above, read accesses by software in external debug mode are masked such that bit fields which are not software-owned (but are hardware-owned) return a zero. In this manner, consistency is maintained by the software operations. However, note that in one embodiment, when the hardware debugger reads a debug register, such as DBSR 49, its full values are provided. That is, even the values for those bit fields that are software-owned are provided to the hardware debugger.

Therefore, it can be appreciated how a hardware debugger and a software debugger can run contemporaneously, with debug resources shared between the hardware debugger and the software debugger. In one embodiment, the ability to enable availability of a portion of the debug resources for use by the debug software while in external debug mode allows for the hardware debugger to be able to debug the software debugger. For example, in one embodiment in which interrupts are enabled, occurrences of a software-owned debug event may generate an interrupt which is then handled by a software interrupt handler. This handler (i.e. software routine) can then suspend execution or halt the processor so as to provide control to the hardware debugger. In this manner, the hardware debugger can direct debug operations via external debug command register 33 and thus debug the debug software itself. Note that in alternate embodiments, other types of storage circuitry or logic circuitry may be used to actually enable availability of debug resources to software rather than via a control register such as debug resource control register 41.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 18 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method, comprising:
   providing an integrated circuit having a plurality of debug resources usable exclusively for debug operations, wherein the debug operations comprise operations directed by debug software executed by the integrated circuit and operations directed by external debug hardware which is external to the integrated circuit;
   enabling availability of a first portion of the debug resources for use by the debug software, wherein a second portion of the plurality of debug resources are committed for exclusive use by the external debug hardware, and wherein the first portion is exclusive of the second portion; and
   performing operations directed by the debug software using at least one debug resource of the first portion of the debug resources and operations directed by the external debug hardware using at least one debug resource of the second portion of the debug resources,
   wherein:
      the step of providing is further characterized by the debug resources comprising fields of a plurality of debug registers and by the integrated circuit having a control register, wherein the control register identifies uses of the debug resources;
      the step of enabling is further characterized by loading the control register in response to the external debug hardware to identify the first portion and the second portion; and
      setting fields of a first debug register of the plurality of debug registers in response to the debug software based on the loading of the control register; and
      wherein the step of enabling is further characterized as masking a first set of fields of the first debug register in response to the control register so that the first set of fields is non-responsive to the debug software.

2. The method of claim 1, wherein the step of performing is further characterized as occurring while contemporaneously running the external debug hardware and the debug software.

3. A method, comprising:
   providing an integrated circuit having a plurality of debug resources usable exclusively for debug operations, wherein the debug operations comprise operations directed by debug software executed by the integrated circuit and operations directed by external debug hardware which is external to the integrated circuit;
   enabling availability of a first portion of the debug resources for use by the debug software, wherein a second portion of the plurality of debug resources are committed for exclusive use by the external debug hardware, and wherein the first portion is exclusive of the second portion; and performing operations directed by the debug software using at least one debug resource of the first portion of the debug resources and operations directed by the external debug hardware using at least one debug resource of the second portion of the debug resources, wherein:
the step of providing is further characterized by the integrated circuit further comprising a control register;
the step of committing is further characterized by the control register identifying the first portion and the second portion;
the step of providing is further characterized as the debug resources comprising fields of debug registers; and
the step of committing is further characterized as establishing settings of the control register responsive to the external debug hardware and by the control register enabling a first set of fields of the debug registers to be executed by the debug software and a second set of fields of the debug registers to be masked from the debug software.

4. The method of claim 3, wherein:
the step of providing is further characterized by the integrated circuit further comprising a second control register and by the debug resources comprising at least one comparator and counters; and
the step of committing is further characterized as loading the second control register in defining the first portion of the debug resources and the second portion of the debug resources.

5. An integrated circuit, comprising:
a processing unit;
a plurality of debug resources usable exclusively for debug operations,
a control register having a plurality of fields for controlling debug operations, wherein:
each debug operation utilizes some portion of the debug resources;
the integrated circuit has a mode in which all of the fields are available for use by debug hardware external to the integrated circuit; and
the fields that are loaded in response to the debug hardware comprise a first portion of the plurality of fields and result in identifying a first subset of the plurality of debug resources and a second subset of the plurality of debug resources; and
a debug register of the plurality of debug resources that has a first group of fields in the first subset and a second group of fields in the second subset, wherein the second group of fields is responsive to debug software executed by the processing unit.

6. The integrated circuit of claim 5, wherein the processing unit comprises:
a control circuit coupled to the plurality of debug resources; and
an instruction fetch unit coupled to the control circuit and the plurality of debug resources.

7. The integrated circuit of claim 6, wherein the plurality of debug resources comprise a plurality of registers that are for being used exclusively for debugging.

8. The integrated circuit of claim 7 wherein the processing unit further comprises a load/store unit coupled to the control circuit and the plurality of debug resources.

9. The integrated circuit of claim 8, wherein the plurality of debug resources further comprise a counter.

10. The integrated circuit of claim 9, wherein the plurality of debug resources further comprise a comparator.

11. A method of running a hardware debugger and debug software on an integrated circuit, comprising:
providing a plurality of debug resources for use in performing debug operations on the integrated circuit;
identifying a first subset of debug resources from the plurality of debug resources, wherein the first subset of debug resources are the debug resources not required by the hardware debugger and available to the debug software, wherein the hardware debugger is external to the integrated circuit, and identifying a second subset of debug resources from the plurality of debug resources, wherein the second subset of resources is what remains of the plurality of debug resources after the first subset has been identified in the step of identifying the first subset;
contemporaneously running the hardware debugger and debug software, wherein:
the debug software is executed by the integrated circuit;
the hardware debugger uses the second subset of resources and not the first subset of debug resources; and
the debug software uses the first subset of resources and not the second subset of debug resources.

12. The method of claim 11, wherein the step of identifying the set of debug resources is further characterized by the set of debug resources being exclusively for debugging.

13. The method of claim 11, wherein the step of identifying is further characterized by the identifying the first subset inherently identifying the second subset.

14. The method of claim 11, wherein the step of providing is further characterized by the debug resources comprising registers.

15. The method of claim 11, wherein the step of contemporaneously running the hardware debugger and debug software is further characterized as using the hardware debugger to debug the debug software.

16. The method of claim 11, wherein:
the step of providing is further characterized as providing debug registers and a control register having fields, wherein:
the debug registers and the control register are on the integrated circuit, and
the control register specifies uses of the debug resources responsive to the debug software;
the step of identifying is further characterized by loading the control register using the hardware debugger to mask a first group of fields of the debug registers; and
the step of contemporaneously running is further characterized by the debug software being masked from the first group of fields.

17. The method of claim 11, wherein:
the step of providing is further characterized as having a control register and a debug register, wherein
the control register has a plurality of fields for controlling debug operations;
each debug operation identifies use of some portion of the debug resources;
the integrated circuit has a mode in which all of the fields are available for use by the hardware debugger external to the integrated circuit; and
the step of identifying the first subset of debug resources is further characterized by loading a first subset of plurality of fields of the control register in response to the hardware debugger, whereby the first subset of fields defines the first subset of debug resources.

\* \* \* \* \*